Patented June 11, 1929.

1,716,540

UNITED STATES PATENT OFFICE.

GASTON DUBREUIL, OF LEVALLOIS-PERRET, FRANCE, ASSIGNOR TO SOCIÉTÉ ANONYME POUR TOUS APPAREILLAGES MECANIQUES, OF LEVALLOIS-PERRET, FRANCE, A FRENCH SOCIETY.

APPARATUS FOR MEASURING AND DISTRIBUTING LIQUIDS.

Application filed June 7, 1926, Serial No. 114,234, and in Belgium June 13, 1925.

This invention relates to apparatus for measuring and distributing liquids and more especially to apparatus adapted to handle gasoline and similar inflammable liquids.

One of the objects of the invention is to provide a reservoir capable of delivering successively any chosen volume of liquid.

Another object is to provide a cam controlled system of valves for filling and discharging the reservoir, and to dispose the whole of the controlling system so that it remains constantly out of contact with the liquid.

Still other objects will appear in the course of the description which will now be given in connection with the accompanying drawings, in which:—

Figure 1:
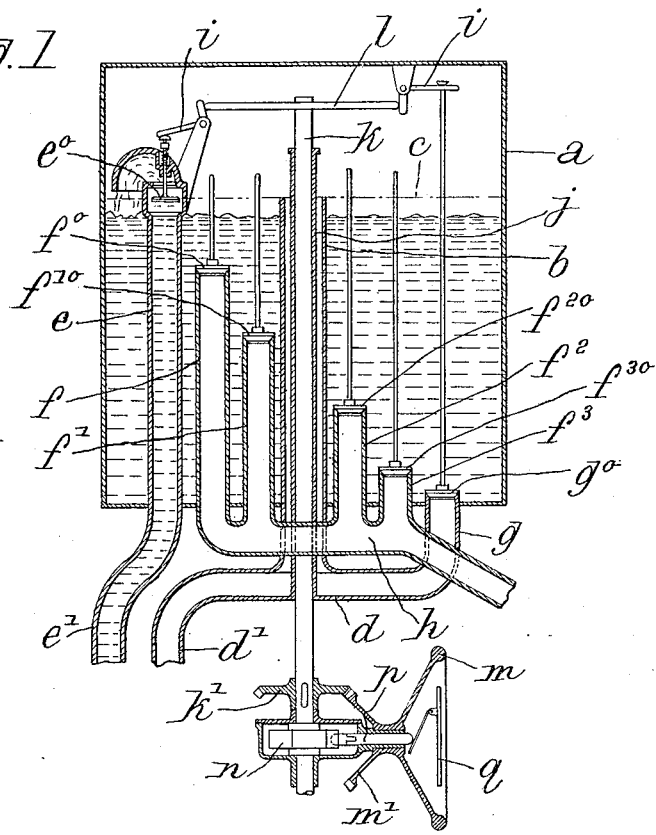
Fig. 1 is a vertical section showing the reservoir with its charging and discharging devices.
Figure 2:
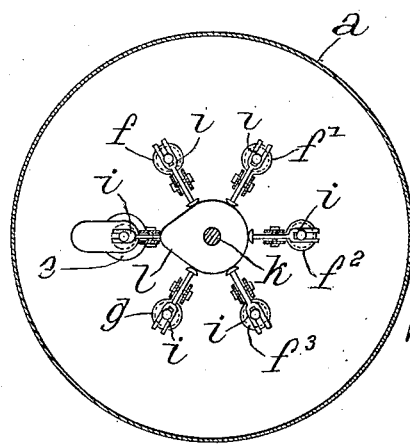
Fig. 2 is a schematic plan showing the relation of the valve control mechanism and the reservoir.

Referring to the various figures of the drawings, there is shown a reservoir $a$, preferably comprising a cylinder mounted between metal supports and having a capacity somewhat greater than the maximum charge of liquid intended to be stored and measured, a tube $b$ extending axially into the reservoir and terminating at one end at the maximum liquid level $c$ of the reservoir and at the other end in an overflow return conduit $d$, and 6 tubes $e$, $f$, $f^1$, $f^2$, $f^3$, $g$ disposed around the vertical axis of reservoir $a$. Tube $e$ is arranged to discharge above the level of the upper extremity of tube $b$ and is connected through feed conduit $e^1$ to a pump or other contrivance for supplying liquid to the reservoir. The length of tubes $f$, $f^1$, $f^2$, $f^3$ is adjusted so that the volumes of the parts of the reservoir $a$ comprised between the level $c$ and the respective levels passing through the top of the said tubes correspond for example to volumes of 5, 10, 15 and 20 liters or gallons of gasoline. The bottoms of tubes $f$, $f^1$, $f^2$, $f^3$ are all connected to a single discharge conduit $h$ leading to a flexible hose or similar form of delivery contrivance. Tube $g$ is placed at a level somewhat below the upper extremity of $f^3$ and serves as a drain tube for the reservoir. The discharge end of $g$ is connected to the overflow receiving conduit $d$. Tubes $e$, $f$, $f^1$, $f^2$, $f^3$, $g$ are provided at their upper ends with valves $e^0$, $f^0$, $f^{10}$, $f^{20}$, $f^{30}$, $g^0$ respectively and each valve is connected to control levers $i$ located in the upper part of the reservoir so that the whole of the controlling system remains constantly out of contact with the liquid. A tube $j$ extends axially through tube $b$ and carries a shaft $k$ keyed at its upper extremity to cam $l$. Means to be described later are provided for turning shaft $k$ and, with it, cam $l$. Each of the valves is provided with a spring actuated closure so that when cam $l$ is turned in a given direction it acts successively on the respective levers of the valves $e^0$, $f^0$, $f^{10}$, $f^{20}$, $f^{30}$ and $g^0$ so as to successively open said valves, and so that the valve $f^0$ can only be opened when the valve $e^0$ has been closed, and that the valve $g^0$ can only be opened when all valves $f^0$, $f^{10}$, $f^{20}$ and $f^{30}$ are each returned to their closed position.

The operation of the apparatus is as follows: Cam $l$ is moved so as to open the controlling valve $e^0$; liquid then flows into the reservoir until the liquid reaches the level $c$ the excess escaping through overflow $b$; the cam $l$ is then turned so as to come opposite the valve corresponding to the volume of liquid desired to be measured; liquid will flow past the valve selected to be opened and will be delivered through conduit $h$. When it is desired to empty the tank completely, cam $l$ is turned so as to actuate valve $g^0$.

The above arrangement is such that charging of the reservoir is rendered impossible while discharge is taking place. It will be noted, also, that the cam and other mechanisms for controlling the valves are all located above and out of contact with the liquid thereby avoiding the necessity for stuffing boxes or other forms of packing. Tubes $f$, $f^1$, $f^2$, $f^3$ are each closed by a valve at their upper extremities so that they are not filled with liquid during the filling of the reservoir so that the internal capacity of said tubes does not affect the accuracy of the volume of fluid to be measured.

Figure 4:
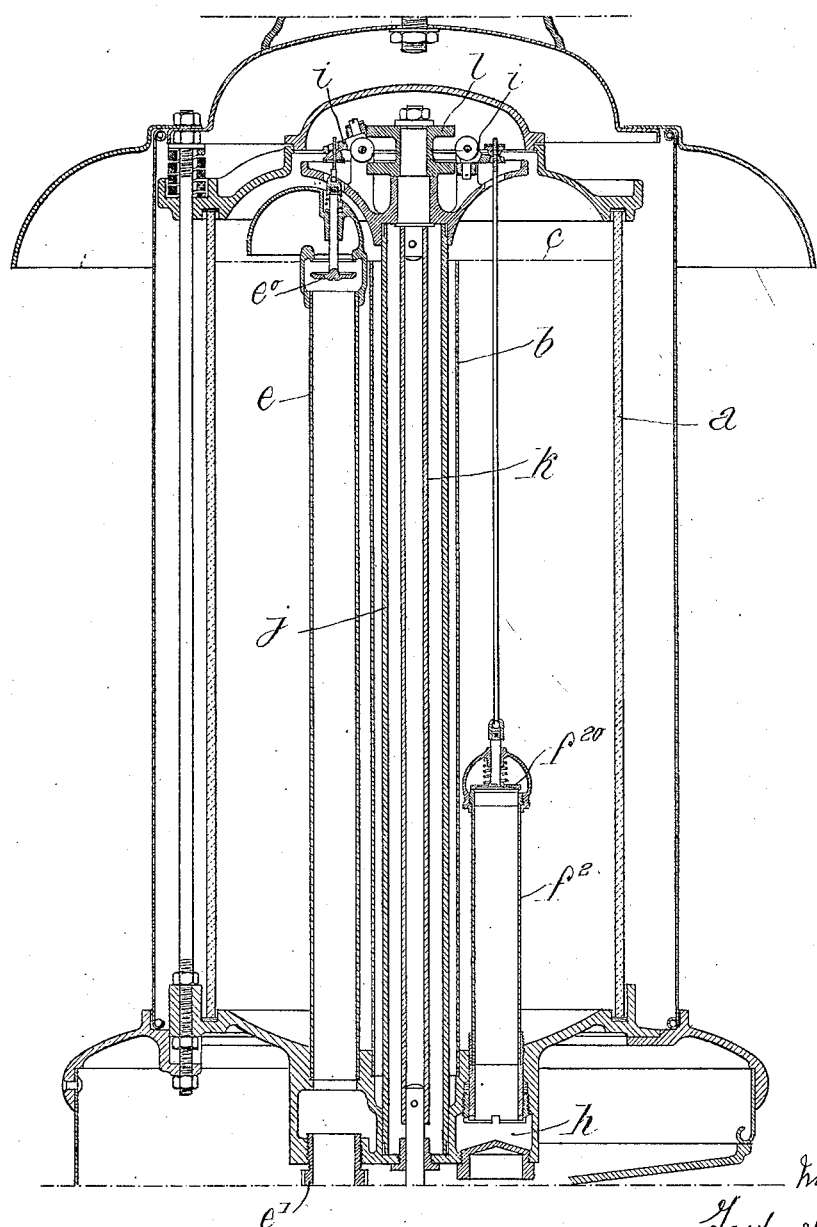
Fig. 4 is a vertical section through a second form of distributing reservoir.

The valves are preferably arranged so that those controlling the tubes $f$, $f^1$, $f^2$, $f^3$ and $g$ each open upwardly and close by their own weight plus the action of proper compression springs. Valve $e^0$, should, however, be arranged to open in the opposite direction i. e. downwardly, and to close under the pressure of the liquid in the tube $e$ combined with the action of a spring arranged as shown in Figs. 1 and 4. In tube $e$ the liquid pressure is applied to the valve in the opposite direction to that exerted on the other valves, thus necessitating an inverse opening movement. It will be noted in Fig. 1, that the fulcrum of the lever $i$ controlling valve $e^0$ is below the level of cam $l$, while the lever controlling $g^0$ (and the other valves) is above the cam level. The action of cam $l$ in pushing against the vertical part of these two levers, it will be seen, will result in movement of the horizontal part of said levers in opposite directions. Valve $e^0$ will therefore open downwardly and the other valves upwardly. In the form of valve opening arrangement shown in Fig. 4, fulcrums of the levers are arranged on the same level. Opposite movement of the valves is here obtained by disposing the vertical arms of the levers so that they point in opposite directions and by providing a double cam surface $l$ arranged to contact separately with the lever attached to valve $e^0$ and those connected to the other valves.

Tube $e$ is preferably provided at its upper extremity with a bent portion adapted to deflect the incoming liquid away from the valve control mechanism.

Tubes $f$, $f^1$, $f^2$, $f^3$ are fixed in such a manner in the bottom of the reservoir that they are easily accessible at their lower end through the cap $h$ so that it is easy to regulate the height of the upper end opening into the reservoir $a$ and to obtain a great accuracy of the measures.

Figure 3:
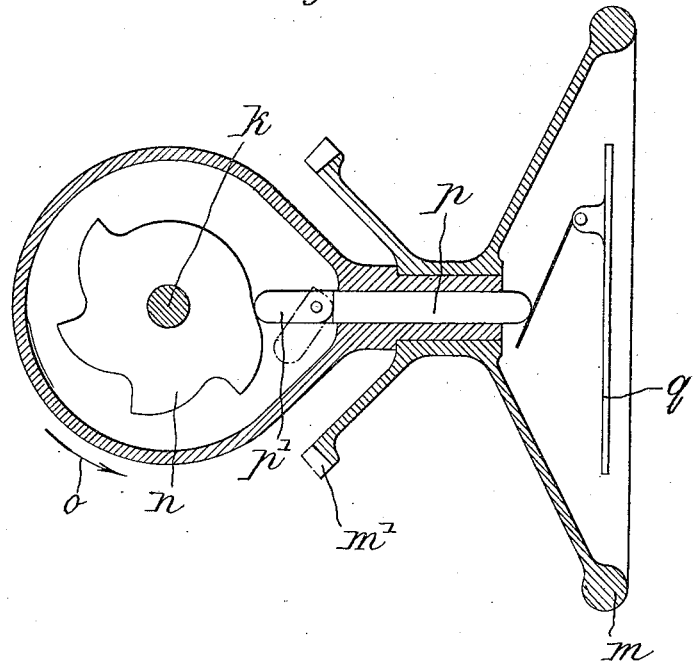
Fig. 3, is a section of the control wheel.
Figure 5:
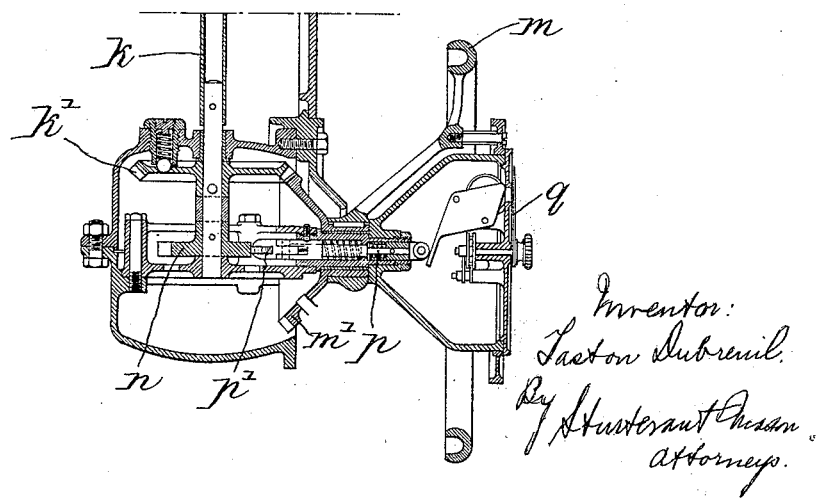
Fig. 5 is a section taken at right angles to the direction of the section shown in Fig. 3 of another form of control wheel.

Shaft $k$ and cam $l$ may be manipulated by a crank, a hand wheel or other convenient device and preferably should be connected to some such volume counting device as is shown in Figs. 3 and 5. The mechanisms illustrated in these figures include a bevel gear $k^1$ keyed to shaft $k$, a cam $n$ also keyed to said shaft, said cam having a series of projections thereon corresponding in position to the opening of valves $f^0$, $f^{10}$, $f^{20}$ and $f^{30}$ respectively, a pin $p$ slidably mounted in the plane of cam $n$ and contacting by means of a finger $p^1$ with the cam surface (the finger is shown fitted with a roller in Fig. 5); springs for holding finger $p$ in contact with the cam and a counter $q$ adapted to be actuated by each longitudinal movement of pin $p$. Finger $p^1$ is pivotally mounted on pin so as not to register unless cam $n$ turns in the direction of the arrow $o$ shown in Fig. 3. Movement of shaft $k$ is effected through wheel $m$ and bevel gear $m^1$. One or a series of spring pressed balls serve as latches for engaging with a recess or recesses in bevel gear $k^1$ so as to hold shaft $k$ in any single position corresponding to the opening of any one of the six valves. An abutment may be arranged to prevent displacement of the cam in the direction of the arrow in Fig. 3, beyond the position of valve $f^{30}$ and also to prevent movement in the opposite direction beyond the position corresponding to valve $g^0$.

What I claim is:—

1. In a liquid measuring and distributing apparatus, a reservoir, a plurality of discharge tubes each having a control valve at the upper end, a filling tube through which the liquid may be forced into the reservoir, said filling tube opening into the reservoir above the liquid level of the greatest volume to be measured, an overflow tube extending substantially centrally of the reservoir, the end of said overflow tube being open to the reservoir at a predetermined maximum level, the discharge tubes being arranged concentrically about the overflow tube, and devices to actuate the valves of the discharge tubes selectively and independently from that of the filling tube, said devices including a single actuating means arranged in said reservoir above the maximum liquid level.

2. In an apparatus according to claim 1, in which the overflow tube is vertically disposed in the reservoir, a guide tube within said overflow tube and extending above the maximum liquid level in the reservoir, a shaft journaled in said guide tube, a cam fixed at the upper end of said shaft, and means to rotate said shaft located beneath said reservoir, said cam being a part of said actuating devices.

3. In an apparatus according to claim 1 having a plurality of discharge tubes with their upper ends opening at different levels into said reservoir so that a unit of volume of the liquid is contained in said reservoir between the respective successive liquid levels determined by said upper ends, a shaft in said overflow tube and journaled for rotation about a vertical axis, means carried by said shaft to open said valves selectively and in regular succession by increments of unit volume upon successive partial rotations of said shaft, a cam located on the lower end of said shaft and having projections each corresponding to one of said discharge tubes, means to limit the movement of said cam beyond predetermined positions of the shaft, a counter, means actuated by the projections of the said lower cam during actuation of the selective variations of the discharge tube to operate said counter, and spring means included in said counter actuating means to allow free operation of the cam and its projections in one direction, and to cause the actuation of said counter during the movement of the cam in the opposite direction and in accordance with the volume of liquid to be discharged.

4. In an apparatus according to claim 1, a shaft disposed in said overflow tube and extending upwardly in said reservoir to above the liquid level therein and connected to said actuating device, a hollow second shaft at a substantial angle to said first shaft, bevel gears on said shafts and in mesh with each other, a cam on said first shaft, a counter, a plunger movable axially in said second shaft and adapted to actuate said counter, said cam plunger cooperating during the movement of said first shaft to effect registration of said counter according to the movement of said shaft.

5. In a liquid measuring and distributing apparatus, a reservoir, a plurality of discharge tubes each having its upper end open to said reservoir at a different level, a control valve for each of said discharge tubes and adapted by downward movement to close the end thereof so that the hydrostatic pressure in said reservoir will maintain the valve closed, a filling tube through which the liquid may be forced into said reservoir and having its upper end opening into the reservoir above the liquid level of the greatest volume to be discharged, an overflow tube to determine the maximum liquid level in said reservoir, a valve in said filling tube adapted to open against the direction of movement of the entering liquid so that the liquid pressure in the filling tube will hold said valve closed, and devices located above the liquid level to actuate selectively the valves of the discharge tubes and the filling tube.

6. An apparatus of the class described comprising in combination a reservoir, an overflow tube, a filling tube, and discharge tubes, said filling and discharge tubes being disposed around the vertical axis of the reservoir, valves closing the tops of the said filling and discharge tubes, levers for controlling said valves, a cam actuating said levers, and means for rotating said cam, said levers, cam and means being mounted in such a manner that they remain constantly out of contact with the liquid.

7. An apparatus of the class described comprising in combination a reservoir, an overflow tube, the axis of which coincides with the axis of the reservoir, a filling tube and discharge tubes disposed around the said overflow tube, valves closing the top of the said filling and discharge tubes, a guiding tube concentrically mounted in said overflow tube, a shaft rotatably mounted in said guiding tube, a cam fixed at the top of said shaft, over the upper level of the liquid in the reservoir, levers actuated by the said cam mounted above the said level in the said reservoir and controlling said valves.

8. An apparatus of the class described comprising in combination an overflow tube, a filling tube, discharge tubes, valves closing the top of said filling and discharge tubes, means for opening downwardly the valve of the filling tube and upwardly the valves of the discharge tubes and a bent portion provided at the top of the filling tube for deflecting the incoming liquid.

In testimony whereof I have hereunto set my hand.

GASTON DUBREUIL.